United States Patent [19]

Wachtel

[11] 3,725,573

[45] Apr. 3, 1973

[54] VIDEO BUFFER

[75] Inventor: Alan Wachtel, Huntington Station, N.Y.

[73] Assignee: Sanders Associates, Inc., Nashua, N.H.

[22] Filed: Aug. 31, 1971

[21] Appl. No.: 176,598

[52] U.S. Cl.......178/6.6 DD, 178/DIG. 3, 235/92 SH, 340/174.1 G, 340/347 DD

[51] Int. Cl...........H04n 5/78

[58] Field of Search..........178/6.6 A, 6.6 DD; 179/15.55 R; 340/347 DD, 174.1 G; 235/92 SH

[56] References Cited

UNITED STATES PATENTS

| | | | |
|---|---|---|---|
| 3,599,178 | 8/1971 | Jackson | 340/174.1 G |
| 3,310,626 | 3/1967 | Cassidy | 340/347 DD |
| 3,573,638 | 4/1971 | Cox | 307/235 |
| 3,573,799 | 4/1971 | Drinnan | 235/92 SH |
| 3,631,464 | 12/1971 | Dahlberg | 340/347 DD |
| 3,653,014 | 3/1972 | List | 178/DIG. 3 |

*Primary Examiner*—Howard W. Britton
*Attorney*—Louis Etlinger

[57] ABSTRACT

An image transmission system. A television camera scans a projected image and generates a video signal. An input circuit converts the video signal into a two-level signal which is sampled and stored digitally on a magnetic disk or drum. After the signals are stored, they are used to reconstruct a video signal by being recombined and combined with blanking, horizontal drive and synchronization signals from the television camera. All timing is controlled by signals recorded on timing tracks on the magnetic disk or drum.

16 Claims, 8 Drawing Figures

INVENTOR
ALAN WACHTEL
BY [signature]
ATTORNEY

INVENTOR
ALAN WACHTEL
BY
ATTORNEY

INVENTOR
ALAN WACHTEL
BY
ATTORNEY

INVENTOR
ALAN WACHTEL
BY [signature]
ATTORNEY

INVENTOR
ALAN WACHTEL
BY
ATTORNEY

VIDEO BUFFER

BACKGROUND OF THE INVENTION

This invention generally relates to image transmission systems. More specifically, it relates to systems for storing a number of images magnetically for simultaneous display.

Data may take various forms and can be stored differently when necessary. For example, a magnetic memory unit is often used to store data to be manipulated in a data processing system. Magnetic storage allows direct and easy data manipulation but it becomes expensive for storing large quantities of textual or graphical information("text" in the following discussion). Furthermore, the text itself is normally not manipulated so the random access capabilities of magnetic memories are usually not used in searching text. In many data retrieval systems, therefore, the magnetic memory only contains indices to text storage locations, the text itself being stored optically.

With some conventional optical storage devices, a portion of the text is photographed and stored on one frame of microfilm. Individual microfilm frames are combined as strips which are stored on reels or are mounted on cards to facilitate physical storage and handling. Extremely dense storage capabilities result.

In the simplest retrieval system, several microfilm reading devices, each including a microfilm projector and viewing screen, are located at a central microfilm library or storage location, so that several people can use the library simultaneously. All viewing devices must be located at the central library unless microfilm transportation delays can be tolerated. A single operator uses an entire reel or card to project a specific frame; thus no one else can simultaneously view another frame on the same reel or card. Therefore, this system requires equipment duplication and, from a practical standpoint, limits the availability of information.

In another system, an operator at a remote location designates a frame for projection onto a screen at the central library location. He also actuates a television transmission system including a television camera at the central library location and a television receiver at his remote location. The television camera continuously scans the projected image and transmits a television signal to the operator's receiver. In this system with its continuous scanning, the number of television transmission systems and microfilm reading devices determines the maximum number of operators who can use the system simultaneously. For example, if the system includes 10 television transmission systems and ten reading devices, the system can transmit only ten images simultaneously. In addition, only one person can view text stored on a given reel or card.

For a large system, the number of television cameras or projection systems can become prohibitively expensive. Further, true time-shared operation is not achieved, even though limited number of operators can use the system simultaneously. Merely expanding the system by adding additional equipment tends to increase system complexity and cost without a corresponding increase in its capability.

Therefore, it is an object of this invention to provide a time-shared system for transmitting images to remote locations.

It is another object of this invention to provide a time-shared image transmission system which reduces the number of transmitting devices required in prior systems.

It is another object of this invention to provide an image transmitting system which enables a given image to be transmitted to different locations simultaneously but independently.

SUMMARY

In accordance with my invention, signals from a television camera representing displayed text are converted to a suitable form and then stored in a direct access memory device, such as a magnetic disk or drum. They are then reconverted to a form suitable for visual display.

In this system, an operator selects and projects a frame conventionally. The television camera scans the projected image and generates a video output signal. Other input circuitry converts the video signal into parallel digital signals having an upper frequency limit which is compatible with the recording characteristics of the memory device. Once this text is stored in the direct access memory device, the television camera can scan the same or another displayed image for storage in another storage location. As a single frame can be scanned quickly, each frame of microfilm is substantially immediately available to any use and substantially time-shared access to all of the stored text is provided.

After the signals are recorded, they are repeatedly retrieved and recombined to generate an output video signal. This signal is displayed by a display unit of the type that responds to video signals.

This invention is pointed out with particularity in the appended claims. A more thorough understanding of the above and further objects and advantages of an image transmission system constructed in accordance with the invention can be attained by referring to the following description taken in conjunction with the accompanying drawings.

DESCRIPTION OF AN ILLUSTRATIVE EMBODIMENT

A. General Description

Figure 1:
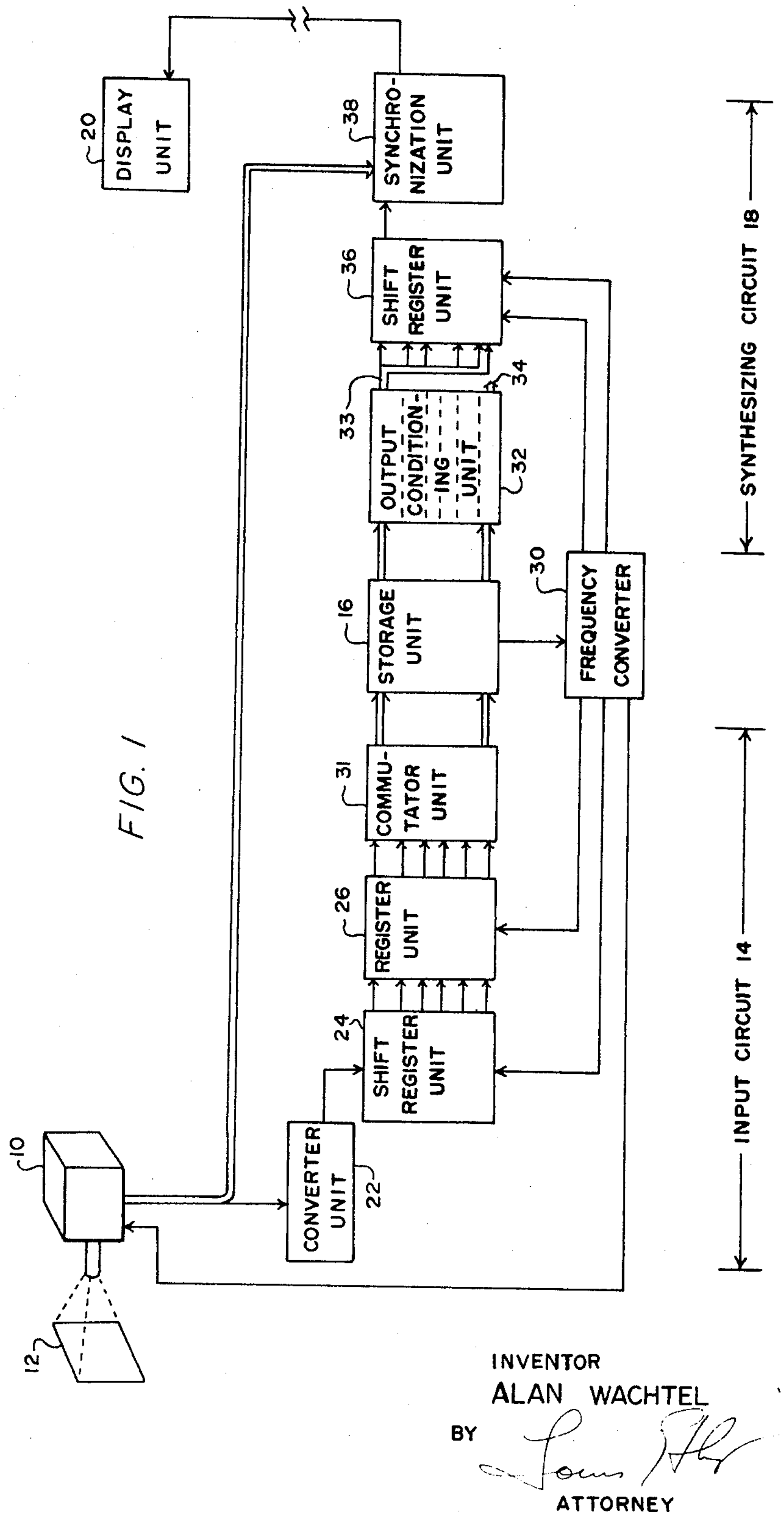
FIG. 1 depicts an image-transmission system constructed in accordance with this invention.

The apparatus for selecting and projecting an image onto a screen is not described as it forms no part of this invention. Therefore, FIG. 1 shows a television camera 10 for scanning an image projected onto a screen 12.

The television camera 10 produces signals representing the picture and commonly known as video signals. These video signals are applied to an input circuit 14 which modifies them for storage in a magnetic storage unit 16. The information is subsequently retrieved from the storage unit 16, and a synthesizing circuit 18 generates an output video signal. A display unit 20 converts the output video signal into a displayed image.

In a preferred embodiment of this invention, the storage unit 16 comprises a magnetic disk memory device. It will become evident, however, that other recirculating memory devices can be substituted for the disks. Specific frequencies are also included for reference; these frequencies are approximate and are included for illustrative purposes only.

The video signals cannot be directly stored on a magnetic disk because the disk cannot reliably record a signal with a frequency in excess of 5 MHz, whereas, the video signals may have a bandwidth of about 24 MHz. Moreover, the input circuit 14 samples the signal at twice the maximum bandwith in accordance with known principles. Consequently, a signal with a maximum bandwidth of 48 MHz must be stored.

Still referring to FIG. 1, a video-to-digital converter 22 continuously converts the video signal from the camera 10 into one of two distinct values. All parts of the video signal correspond to either "black" or "white" after passing through the converter 22; all "-gray" information is converted to black or white. Most displayed text, however, is displayed on a distinct background. For example, alphanumeric printing usually comprises black symbols on a white background, while graphical information may comprise black lines and symbols on a white background. As a result, there is no undue degradation when gray information is lost.

The converter unit 22 energizes a shift register unit 24 that shifts in response to a 48 MHz clock pulse signal. Hence, the output from converter unit 22 shifts into the register unit 24 serially at twice the maximum bandwidth, (i.e., at a 48 MHz rate) to thereby sample the converted video signal from the converter unit 22.

If the shift register unit 24 contains six stages, it fills at an 8 MHz rate. Corresponding stages in the shift register unit 24 and a register unit 26 are connected for parallel transfers of six bits from the unit 24 to the unit 26 in response to an 8 MHz input gating pulse, i.e., each time the register unit 24 becomes filled with new information.

As described later, a frequency converter 30, energized by timing signals retrieved from a timing track in the storage unit 16, produces these 8 MHz input gating pulses and other timing signals. The frequency converter 30 includes conventional pulse frequency multiplier and divider circuits for obtaining clocking pulses at different rates from a single source of input pulses supplied from the magnetic disk.

In each stage of the register unit 26, the coincidence of the gating pulse and a logical ONE input signal changes the state of the flip-flop stage; a logical ZERO input does not change the state of the flip-flop. Therefore, a change in the stage of a given stage in the register unit 26 represents a "white" bit for recording purposes while no change represents a "black" bit.

The register unit 26 also reduces the output from the shift register unit 24 from a fundamental frequency of 8 MHz, which cannot be reliably recorded in the recording medium, to a fundamental frequency of 4 MHz, which can be recorded reliably.

This frequency reduction is more readily understood by reviewing the circuit operation which provides the maximum frequency signal. This condition occurs while the television camera 10 scans a white portion in the screen 12. The video-to-digital converter unit produces an assertive, or logical ONE, signal continuously under these conditions. As each logical ONE input to a given stage in the register unit 26 changes its state, the output of the corresponding stage in the shift register unit causes the given stage in the register unit 26 to change its stage with each 8 MHz clock pulse. Each stage in the unit 26 thus goes through a complete cycle once for every two clock pulses, or at a 4 MHz rate. As "black", or logical ZERO input signals, do not change the state of the given stage, the fundamental frequency of the output from each stage in the register unit is always less than 4 MHz when the television camera 10 scans "grays" and "blacks".

These signals are coupled through a commutator unit 31 for recording on the magnetic disk. If a system comprises a single television camera and one display unit, the register unit 26 and the storage unit 16 can be connected directly. Where there are several display units 20, the signals for each image are stored separately on a set of tracks reserved for a particular display unit. Similarly, if multiple television cameras are used to further increase retrieval and display efficiency, the signals from a particular television camera must be routed to the proper set of tracks on the magnetic disk. The commutator unit 31 provides this routing function; circuits for this are known in the art, so no additional discussion is required.

The storage unit 16 includes a drive unit for rotating the disk so that the time lapse for one disk revolution and for one television frame are equal. Signals for one image are therefore stored on one set of tracks.

Once the signals representing the text are stored on the disk, the synthesizer circuit 18 responds to the signals on a set of tracks. It continuously and repeatedly reads the signals and from them reconstructs the video signal. As the signals repeat at the television camera frame rate, a continuous visual display can be obtained.

Specifically, six reading transducers (not shown) produce signals corresponding to the stored signals on each track. These signals energize a conditioning unit 32 containing output conditioning circuits 33. FIG. 1 shows one conditioning circuit 33 for energizing a single display unit 20; the arrow 34 represents signals from similar conditioning circuits.

The output conditioning circuit 33 produces six channels of digital data in parallel in response to signals read from six tracks on the disk. These digital signals are fed into a shift register unit 36 in parallel. A first gating signal from the frequency converter 30 loads the signals into the shift register unit 36 at an 8 MHz rate. Another gating signal, at 48 MHz shifts data serially from the shift register unit 36 to a synchronization unit 38.

Various timing signals such as blanking, synchronization and horizontal drive signals are also coupled to the synchronization unit 38 from the television camera 10. The synchronization unit 38 generates a composite video output signal from these input signals, and the video output signal is transmitted to the remotely located display unit 30 which may be a conventional cathode-ray tube display device.

Figure 1A:
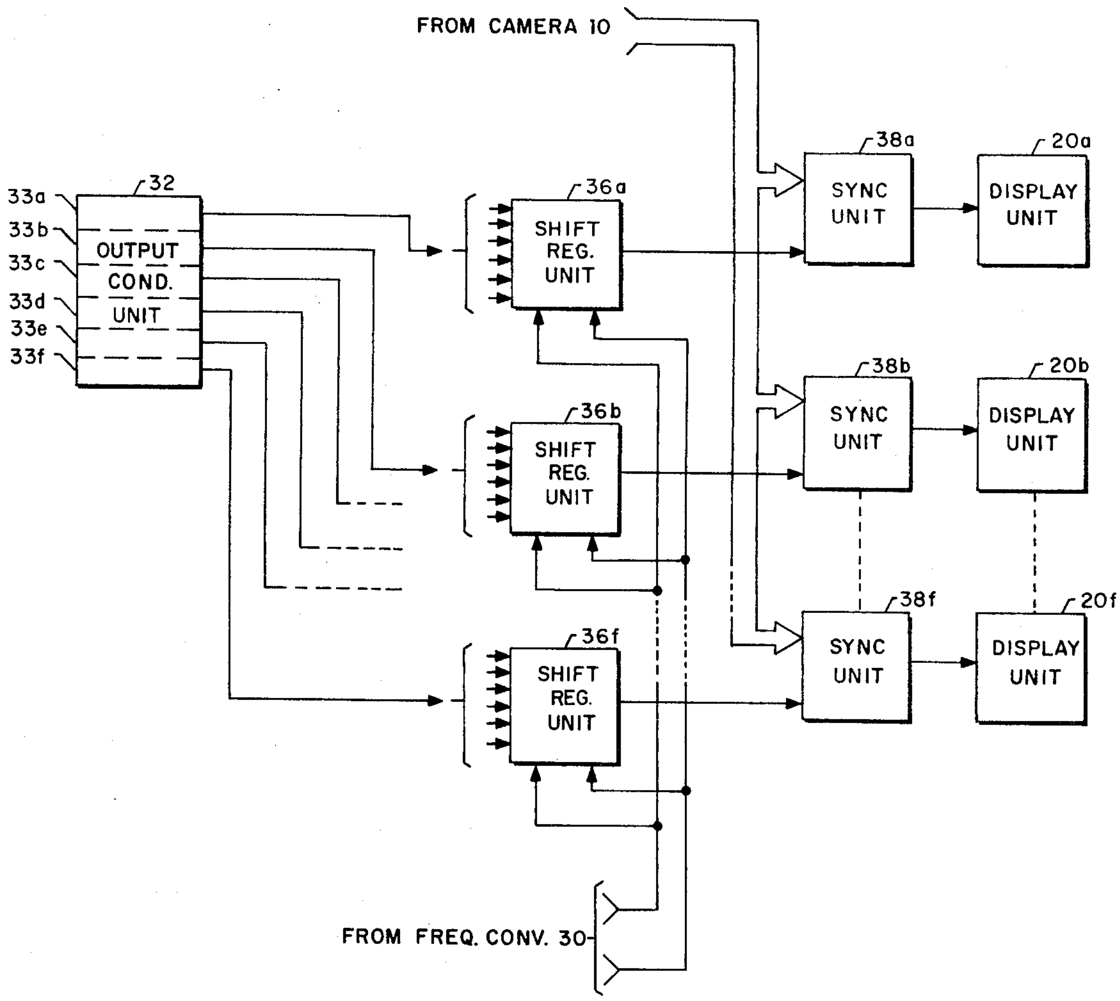
FIG. 1*a* is a schematic block diagram showing how several display units are connected.

As previously mentioned, the output conditioning unit 32 contains several output conditioning circuits, shown in FIG. 1*a* as circuits 33*a* to 33*f* inclusive. The six channels of digital data from each of these circuits are connected to shift register units 36*a* to 36f respectively. Each of these shift register units is also supplied with a gating signal from the frequency converter 30. The data in the units 36*a* to 36*f* is shifted serially to synchronizing units 38*a* to 38*f* respectively. These units each receive blanking and synchronizing signals from the camera 10 and generate composite video output signals which are transmitted to remotely located display units 20*a* through 20*f*, respectively. It is apparent that by this arrangement the various units 20*a* to 20*f* may display simultaneously different images which have been recorded on corresponding tracks of the storage unit 16.

B. System Timing

Figure 2:
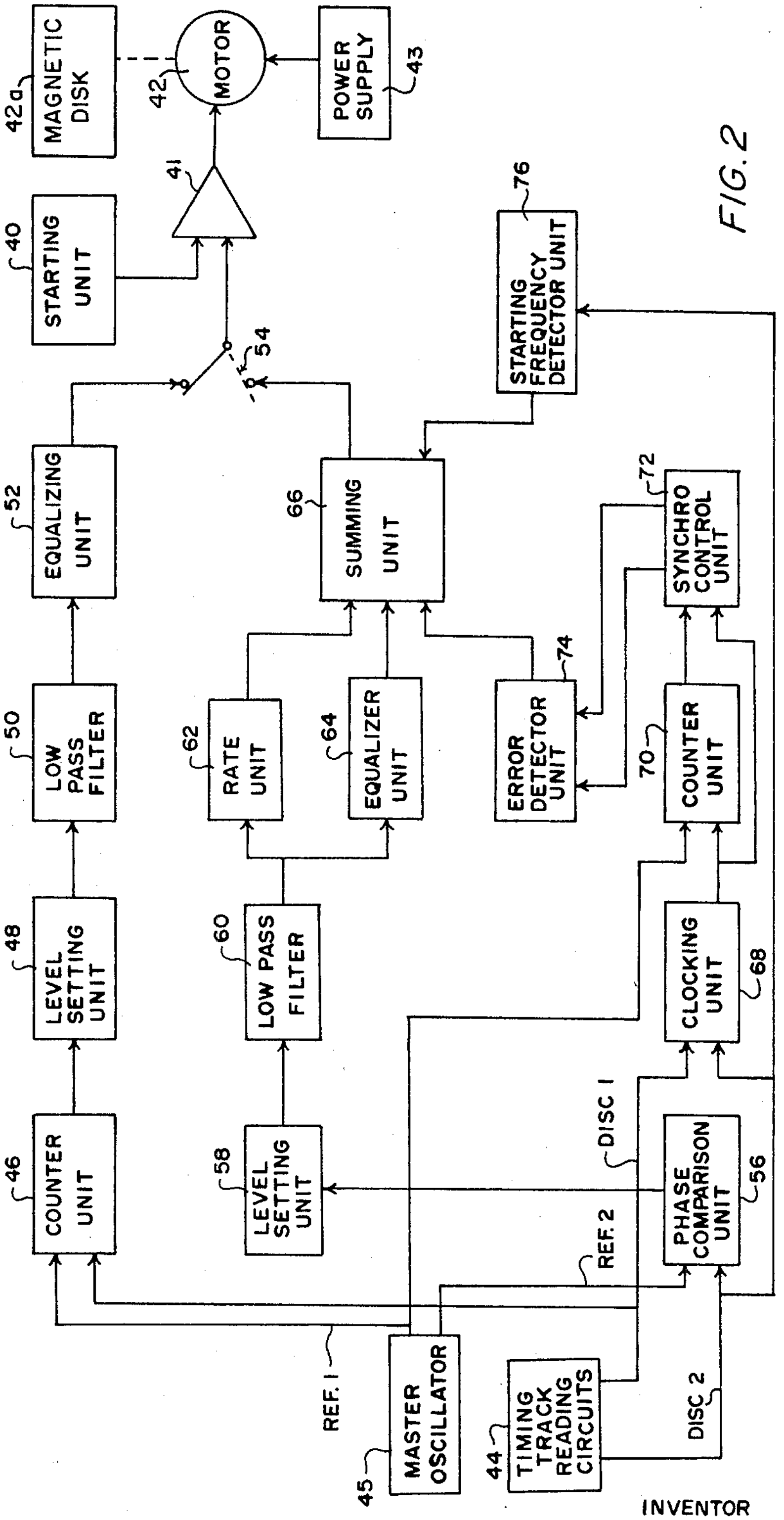
FIG. 2 is a schematic diagram of a control circuit for the storage unit shown in FIG. 1.

As previously indicated, the magnetic disk provides all system timing signals. FIG. 2 illustrates a circuit for driving the magnetic disk so that accurate timing signals result. It is best understood by describing how the timing signals are recorded on the disk and how they are subsequently generated.

One disk track contains a single, pre-recorded bit of information, which, when read, produces one output pulse per disk revolution. Initially, a starting unit 40 energizes an amplifier 41 so that a motor 42 energized by a power supply 43, brings the disk up to speed. The timing signal in the one track is read by a reading circuit 44 which produces a DISC-1 pulse for comparison with a 30 Hz REF-1 pulse from a master oscillator 45.

Both signals energize a counter unit 46. The counter unit 46 generates a first pulse during the REF-1 pulse, and a second pulse during the DISC-1 pulse. It provides a third signal when neither 30 Hz pulse is present. A level setting unit 48 converts the first and second pulses into mutually offsetting values and the third signal to a quiescent value for inputs to a low-pass filter 50, thus the filter produces no output signal when the DISC-1 and REF-1 pulses have the same repetition rate. An output from the low-pass filter 50, therefore, represents a deviation of disk speed from the reference speed defined by the master oscillator 45; in this case, the deviation from an 1,800 r.p.m. standard. The output of the low-pass filter 50 is applied to an equalizing unit 52 which converts the signal to a level required to energize the amplifier 41. This input signal for the amplifier 41 is coupled through a switch 54 during the initial operation to bring the motor 42 up to speed.

Once the disk is up to speed, pulses derived from the master oscillator 45 and corresponding to the horizontal sweep frequency for a television camera are recorded on a second disk track. If the camera scans an image with 1,023 horizontal lines, the pulses have a frequency of approximately 31.5 kHz. If *n* pulses are recorded on the second track, the pulse rate defined by the *n*th and first pulses deviates from the 31 kHz rate. This deviation, or offset, is minimized by iteratively writing the 31 kHz on the second track, until optimal closure is obtained.

Final synchronization is obtained by throwing the switch 54 to the position shown in phantom. Throwing the switch 54 to this position shifts the motor speed control to another set of conditions. Specifically, both the 31 kHz pulses from the master oscillator 45, the REF-2 pulses, and the pulses from the reading circuit 44 which correspond to the 31 kHz pulses on the second track, the DISC-2 pulses, energize a phase comparison unit 56. The phase comparison unit 56 energizes a level setting unit 58, analogous to the level setting unit 48, with a signal which varies with phase displacement. The resulting output signal is averaged in a low-pass filter 60 which produces an output signal indicating the magnitude and direction of phase displacement between the two pulses.

A rate unit 62, an equalizer unit 64 and a summing unit 66 constitute a control circuit with a transfer function $$e_o = k\Delta e_\phi + k_2\,(d\Delta e_\phi/dt)$$

1. where $e_o$ is the output signal which energizes the amplifier 41, and
2. $e_\phi$ is the output signal from the low-pass filter 60.

As a result, any phase errors between the 31 kHz oscillator pulses and those pulses read from the second disk track produce an offsetting control voltage which adjusts the motor speed.

Mechanical loading or supply voltage variations can cause the disk to "slip" one or more positions; for example, if the 30 Hz pulses on the first track and from the master oscillator 45 are in phase initially, some perturbation can cause the disk to slip so the 30 Hz signals are out of phase. The circuit in FIG. 2 monitors this condition and corrects it when it occurs. Both the DISC-1 and DISC-2 signals from the reading circuit 44 energize a clocking unit 68 which generates an output pulse when a 31 kHz pulse and the 30 Hz pulse on the disk coincide. This output pulse energizes a counter unit 70 together with the 30 Hz pulse from the master oscillator 45. The counter units 46 and 70 are analogous. Both the counter unit 70 and the clocking unit 68 energize a synchro control unit 72 which responds to an error signal only during the coincidence of the DISC-1 and DISC-2 pulses. When no slips occur, the control unit 72 does not generate any signal so an error detector unit 74 does not affect the output from the summing unit 66.

If a slip occurs, the clocking unit 68 energizes the counter unit 70 either before or after the REF-1 pulse, and the synchro control unit 72 generates an offsetting error signal. This error signal causes the error detector unit 74 to generate a modifying pulse which produces an offsetting incremental slip. Normally, a pulse from the error detector unit 74 varies the output of the summing unit 66 sufficiently to cause an offsetting slip of approximately 1023/360°, the angular displacement between two pulses on the second track. Alternatively, the error detector unit 74 might energize the summing unit 66 with a continuous offsetting error voltage for making the correction smoothly over the entire revolution.

DISC-2 pulses from the reading circuit 44 also energize a starting frequency detector unit 76 comprising a filter circuit with a natural frequency of 31 kHz. This circuit disables the summing unit 66 to avoid wind-up and other errors caused by applying large error signals during this starting period.

After the 31 kHz signal is written on the second track and synchronization has been achieved, 3 MHz pulses from the master oscillator 45 are written onto a third track. This is done iteratively until an integral number of 3 MHz pulses can be written onto the disk for the corresponding 31 kHz synchronization signal.

During normal operation, the same control occurs. That is, the switch 54 is thrown to an original position while the magnetic disk is brought up to speeds. Then the disk is locked into synchronization with the REF-2 pulses from the master oscillator 45 by throwing the switch 54 to the opposite direction. In this position, a reading head associated with the magnetic disk reads the 3 MHz pulses on the third disk track and energizes the frequency converter 30 shown in FIG. 1. Then the frequency converter 30 generates the various timing pulses.

C. Video-to-Digital Converter

Figure 3:
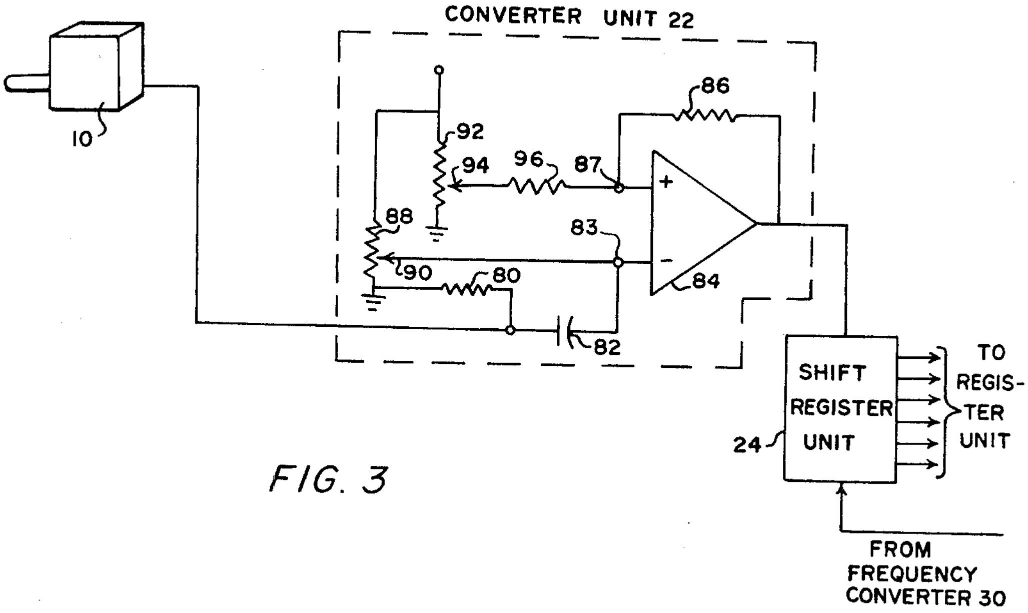
FIG. 3 is a schematic diagram of a video-to-digital converter for use in the circuit of FIG. 1 and FIG. 3A graphically depicts the operation of the converter.

Referring again to FIG. 1, signals from the television camera 10 are applied to the video-to-digital converter 22. One converter, especially adapted for use in systems reading text, is shown in FIG. 3 with its operation being graphically depicted in FIG. 3A. The heart of the converter 22 is a threshold circuit which is energized by the television camera 10. A video signal produced across a resistor 80 is coupled through a capacitor 82 to the inverting input 83 of an operational amplifier 84. The amplifier 84 has positive feedback provided by a resistor 86 connecting the output and non-inverting input 87.

A potentiometer 88 has its wiper 90 connected to the terminal 83 so the variable video and steady-state potentiometer voltages are combined. The feedback signal is summed with another threshold signal developed by the potentiometer 92 including a wiper 94 resistively coupled to the non-inverting unit input 87 by a resistor 96. As described later, the potentiometers 88 and 92 determine a lower threshold and an upper threshold, respectively.

The gain of the amplifier 84 and the degree of positive feedback is sufficient to provide hysteresis in the operation of the amplifier 84. Specifically, as the voltage at the non-inverting input 87 becomes positive with respect to the inverting input voltage, the amplifier 84 saturates in one direction. The voltage at the output remains at the saturated voltage level until the voltage at the inverting input 83 overcomes the feedback voltage and saturates the amplifier 84 in the opposite direction.

Figure 3A:
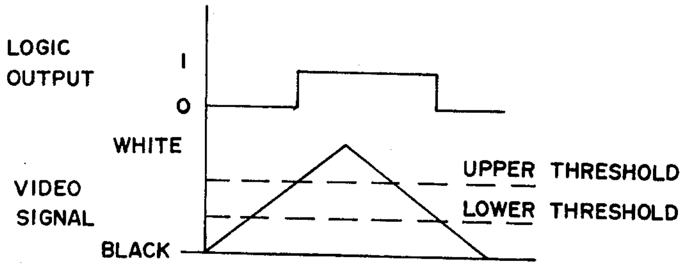

Referring specifically to FIGS. 3 and 3A, assume that the output voltage increases from zero to a positive maximum as the color sensed by the television camera 10 goes from black to white. FIG. 3A shows a voltage as the television camera linearly scans from black through a range of grays to white and back again. By current summing, the feedback and signal voltages with the outputs from the potentiometers 92 and 88, respectively, two threshold levels result. Assuming that the television camera has been scanning pure black, the output from the amplifier 84 produces a non-assertive or logical ZERO signal as shown in FIG. 3A. As the signal increases through the first threshold level, it does not change the output, so "grays" are converted to "-blacks". When the upper threshold level is reached, however, the output from the amplifier 84 generates a logical ONE signal so further "grays" are converted to "whites". The amplifier 84 continues to generate a logical "ONE" signal even as the signal decreases until the input signal to the converter drops below the lower threshold.

The output circuit shown in FIG. 3 produces ambiguity because a given "gray" in the range between the two threshold levels may be converted to either "-black" or "white". With text the potentiometers 88 and 92 are adjusted so that the two threshold levels are nearly equal. This minimizes the area of ambiguity. Ambiguities are also inherently reduced when images of text are transmitted because the symbols and background are normally distinct.

D. Input Circuit

Referring again to FIG. 1, the television camera 10 generates a continuous and variable output signal which video-to-digital converter 22 alters to a two-level signal. This signal is applied to the shift register unit 24 and is sampled by gating the shift register unit 24 input with 48 MHz clock pulses from the frequency converter 30. Each pulse also shifts the contents of each stage of the shift register unit 24 by one position. As the maximum frequency of the output signal from the converter unit 22 is 24 MHz, the shift register unit 24 stores an accurate sample of the converted video signal because the sampling rate is twice the maximum frequency.

If the shift register unit 24 contains six stages, its contents must be transferred to the register unit 26 in parallel at an 8 MHz rate. The frequency converter 30 energizes the input gating circuits for each stage of the register unit 26 with 8 MHz gating pulses. As previously indicated, the maximum fundamental frequency of the output of the register unit 26 is then 4 MHz. Therefore, the video-to-digital converter 22, the shift register unit 24 and the frequency converter 30 sample and convert a 24 MHz continuous video signal into six parallel digital signals which can be accurately stored on the magnetic disk.

E. Synthesizing Circuit

Still referring to FIG. 1, the circuit 18 synthesizes a video signal from the information retrieved from the storage unit 16 and from control signals generated in the television camera 10. Signals on each of the parallel tracks are read conventionally and coupled to the output conditioning unit 33 shown in FIG. 4.

More specifically, the illustrated stage 100 associated with one track includes comparators 102 and 104 having their outputs tied together. A signal from the storage unit 16 energizes one input of the comparator 102 and the other input of the comparator 104. A potentiometer 106, coupled to a negative power supply and a potentiometer 108, coupled to a positive power supply, provide the threshold levels for the comparators 102 and 104, respectively.

As known in the art, a reading head produces an alternate half-cycle of substantially sinusoidal voltage for each successive logical ONE. FIG. 5A shows, for example, the output from the reading head, also the input to the output conditioning unit 33, for a logical signal sequence 111, 010, 010 as comprising three alternate half-waves and two spaced half-waves with each half-wave having an alternate polarity. When this output energizes the comparators 102 and 104 (FIG. 4), the normally saturated output is converted to negative pulses as shown in Graph 5B. A positive going signal from the disk which exceeds the threshold voltage set by potentiometer 108, shown in FIG. 4, drives the comparator 104 to a non-saturated condition and pulls the uneven output to a reference level. A negative going signal becomes more negative than the threshold level set by the potentiometer 106 and drives the comparator 102 to a non-saturated condition to produce a negative pulse.

Certain offset voltages exist in commercially available operational amplifiers. As a result, the signal from the reading head causes both comparators 102 and 104 to saturate as the signal crosses the zero point. Thus, as shown in FIG. 5B, consecutive ONES produce incremental ZERO signals which do not represent correct information. However, the system responds only to true ZEROES because the 8 MHz gating pulses, (FIG. 5C), coupled to an input gate for the shift register unit 36, are centered on the negative pulses. This delays the output signal, shown in FIG. 5D, by one-half pulse width; however, this delayed signal is an exact replica of the information contained in the storage unit 16.

Figure 4:
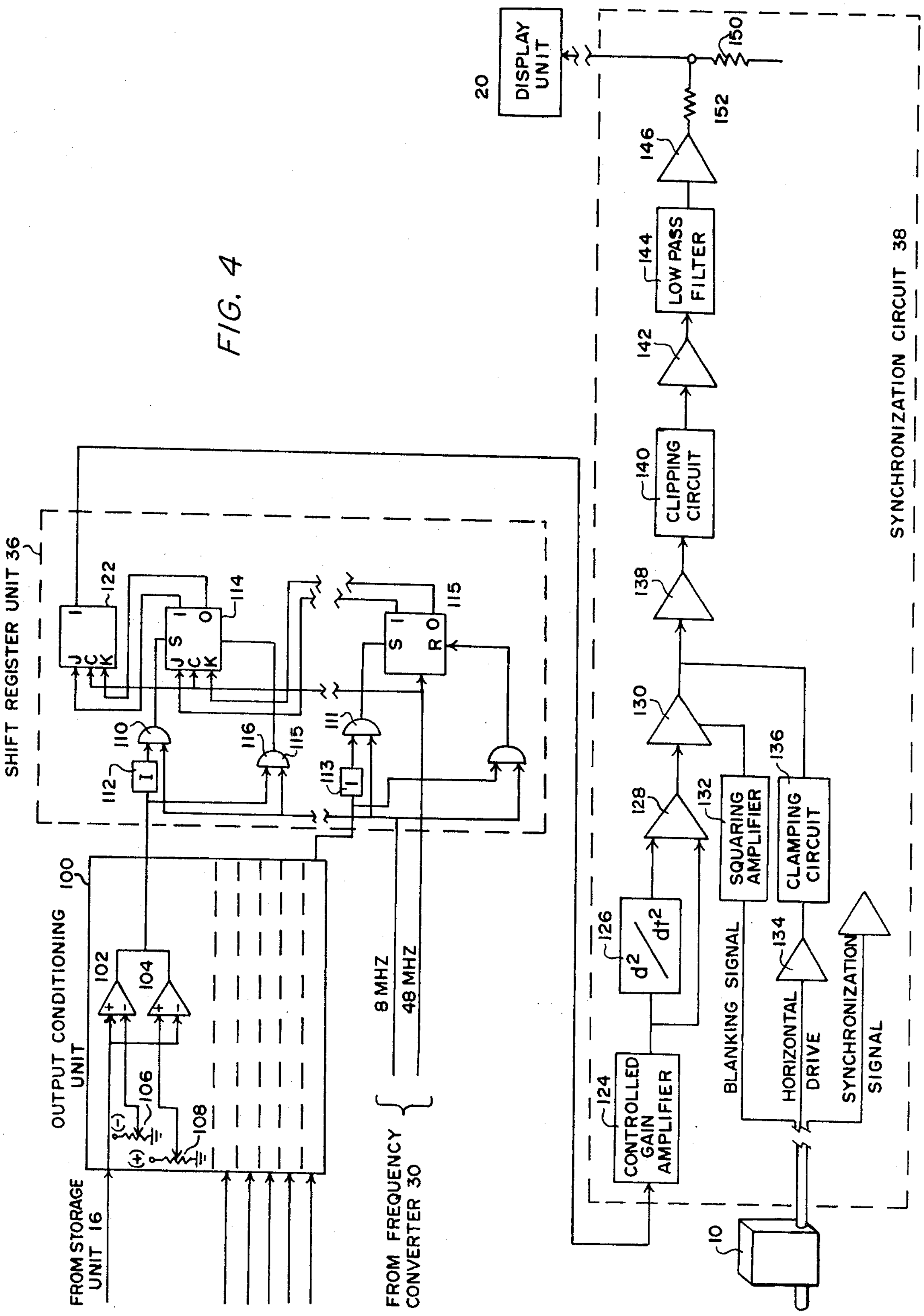
FIG. 4 is a schematic diagram of an output circuit for energizing one viewing device.
Figure 5:
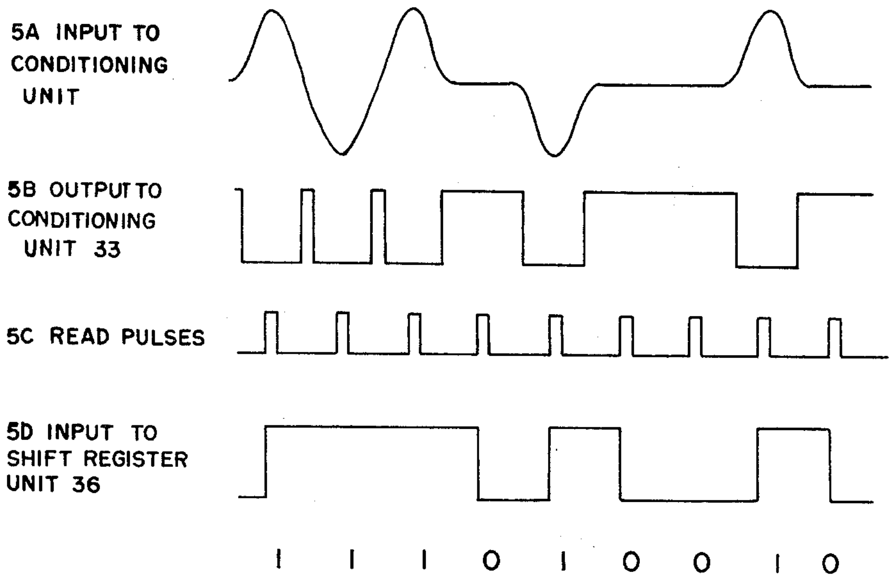
FIGS. 5 and 6 are graphical analyses helpful in understanding this invention.

Details of the shift register unit 36 are also shown in FIG. 4. Input gates 110 and 111 are connected to the first and sixth tracks from the output conditioning unit 33 through inverters 112 and 113 and are enabled by the 8 MHz read pulses. They "set" the flip-flops 114 and 115 on the leading edge of each read pulse when a logical ONE is stored because these flip-flops respond to the leading edge of an assertive pulse applied to the set (S) inputs. The outputs of the unit 33 are applied directly to input gates such as input gate 116 which is also enabled by the 8 MHz read pulses to reset the flip-flop 114 when a logical ZERO is stored. Similar input gates provide resetting signals to the remaining flip-flops. Four intermediate flip-flops are energized by signals from the remaining four tracks, but are not shown for purposes of clarity.

Hence, the flip-flops 114 and 115 are positively and directly set or reset on the leading edge of each read pulse and, with the remaining four flip-flops, store the information from the six parallel tracks until the next 8 MHz clock pulses stores new information in the shift register unit 36.

As also shown, the set and reset outputs, the "1" and "0" outputs for each flip-flop, are coupled to the "J" and "K" inputs of an adjacent flip-flop. For example, the "1" and "0" outputs of the flip-flop 115 are coupled to the "J" and "K" inputs respectively in the flip-flop associated with the next track. Similar signals from the second track are coupled to the "J" and "K" inputs of the flip-flop 114.

A 48 MHz clocking pulse, simultaneously applied to "C" inputs of all the flip-flops, sets a flip-flop if its "J" input is asserted on the trailing edge of the clock pulse. If the "K" input is asserted, the pulse resets the flip-flop on its trailing edge. Each 48 MHz pulse, therefore, shifts the contents of each flip-flop to an adjacent flip-flop. The flip-flops are arranged so the stored data shifts from the shift register unit 36 in the same order as it was originally stored.

Figure 6:
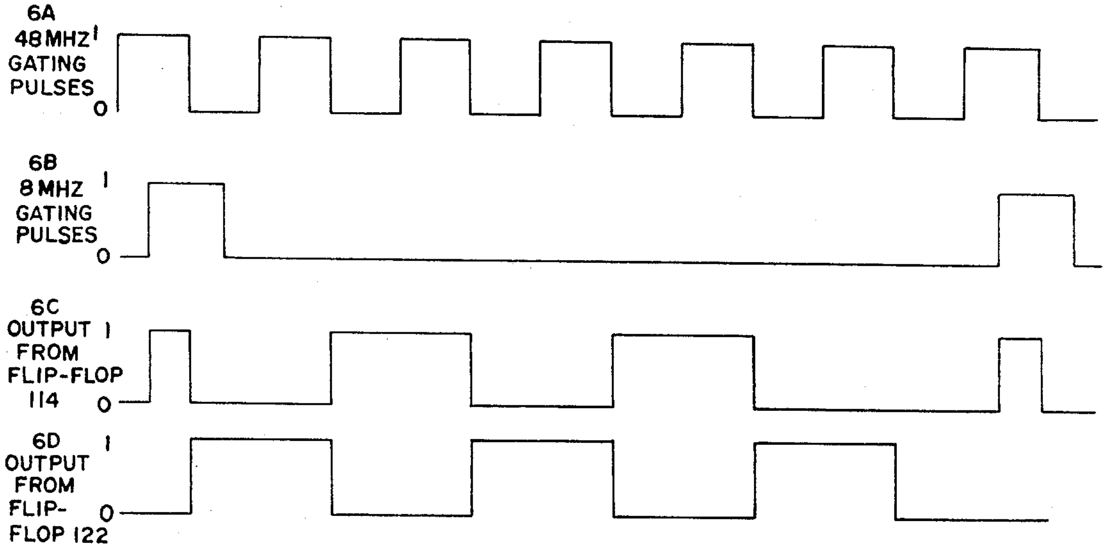

FIG. 6A represents the 48 MHz clocking pulses from the converter 30 (FIG. 1) and FIG. 6B, the delayed 8 MHz reading pulses. If the shift register 36 were to comprise only six previously described flip-flops, signals at the "1" output of the flip-flop 114 (FIG. 4) would produce pulses with uneven widths as shown in FIG. 6C. Assume that the leading edge of an 8 MHz pulse sets the flip-flop 114 and sets the alternate flip-flops (i.e., the six tracks contain a 101010). The next 48 MHz clocking pulse rests the flip-flop 114 on its trailing edge so the first pulse from the flip-flop 114 is shortened. If the flip-flop 115 were initially reset, and the next 8 MHz read pulse set the flip-flop 114, the time required to set the flip-flop 114 after the sixth 48 MHz pulse would be extended and longer than the normal interval.

The shift register unit 36 must produce even pulses and pulse intervals to obtain a good video signal synthesis. This result is achieved by adding another JK flip-flop 122 (FIG. 4) to form a seven-stage shift register. The flip-flop 122 is energized by 48 MHz timing pulses at its "C" input. Signals on the "1" and "0" outputs of the flip-flop 114 energize the "J" and "K" inputs of the flip-flop 122. The resulting signal aT the "one" output of the flip-flop 122 is shown in FIG. 6D.

Assume that a ZERO is read from the flip-flop 114 just before a read pulse sets the flip-flop 114 and resets the flip-flop 120. The trailing edge of the next 48 MHz pulse sets the flip-flop 122 and resets the flip-flop 114. However, the length of the shortened pulse from the flip-flop 114 is extended in the flip-flop 122 which cannot alternate its state until the next 48 MHz pulse terminates.

Similarly, if the signal originally transferred to the flip-flop 115 were a ZERO and the next read pulse transfers "one" to the flip-flop 114, the ZERO output from the flip-flop 122 is delayed by a cycle. Pulses with even widths result to improve the synthesized video signal.

Again referring to FIG. 4, output pulses shifted from the flip-flop 122 energize the synchronization unit 38 to produce the video signals for energizing the display unit 20. The synchronization unit 38 comprises a controlled gain amplifier 124 for converting logical ONE's and ZERO's from the shift register unit 36 into voltages of the proper value. This amplifier and the remaining circuits in the synchronization unit 38 are conventional and are not described except functionally.

As the signal from the shift register unit 36 increases in frequency, the output from the controlled gain amplifier 124 tends to decrease. Such a decrease can adversely effect the resulting video signal so the controlled gain amplifier 124 energizes a second-order differentiating circuit 126. Both the amplified and differentiated signals are applied to a summing amplifier 128.

A blanking signal from the television camera 10 is combined with the output from the amplifier 128 in a blanking amplifier 130 after the blanking signals are modified in a squaring amplifier 132. Horizontal drive signals from the television camera 10 are amplified in an amplifier 134 to energize a clamping circuit 136 and thereby limit the output from the amplifier 130 which energizes an amplifier 138. An amplifier 142 responds to signals from a clipping circuit 140 and energizes a low-pass filter 144 and an amplifier 146 in series before the resulting signal and a synchronizing signal are combined. Synchronizing signals from the television camera 10 energize an amplifier 148. A resistor 150 couples this signal for summing with the output from the amplifier 146 after it is coupled through a resistor 152. The resulting synthesized video signal energizes a conventional television receiver used as the display unit 20.

As the circuit shown in FIG. 4 is physically located in the same area as the television camera, the blanking, horizontal driving and synchronizing signals are conventionally available from the television camera 10. As previously indicated, the magnetic disk generates the master timing signals for the television camera 10 to synchronize the entire system. As a result, a perturbation which varies the output signals from the storage unit 16 produces an offsetting variation in the timing signals from the television camera 10 and minimizes the effect of the perturbation.

The foregoing discussion describes a complete system adapted for transmitting images from a central location to one of several remote locations. In accordance with this invention, digital representations of video signals from a conventional television camera are converted for storage on a magnetic recording medium. These stored signals are synthesized to generate a video signal for the display unit. Although only one specific system is described, various modifications can be made. For example, the frequency converter 30 can take any of several forms. Any device which stores a sequence of signals for sequential and repeated access can store the converted signals. Stored signals might be detected by known peak detection, integration or differentiation detecting circuits rather than the described thresholding circuit and thereby modify the requirements for other functions such as the read pulse delay required to avoid certain effects with the zero crossing circuit. Furthermore, the system has been described generally in terms of a television camera. The term "-camera", however, may include orthicon, vidicon or flying spot scanning types of devices for converting an optical image into electrical signals. While the system has been described generally in terms of circuits which introduce no signal delays, it will be obvious that certain delays are necessarily encountered. However, methods and circuits for compensating such delays are known. Therefore, it is the object of the appended claims to cover all such variations and modifications as come within the true spirit and scope of my invention.

What is claimed as new and desired to secure by Letters Patent of the United States is:

1. A system for displaying a recorded image on a display unit, said system comprising:
   A. a camera for generating control and electrical image signals representing the image,
   B. a converter energized by image signals for generating sequential sets of parallel digital signals in response thereto,
   C. a memory unit with means for
      1. writing the parallel digital signal sets into given locations, and
      2. generating master timing pulses, and
      3. reading means generating output signals representing the stored signal sets in parallel,
   D. a synthesizer responsive to the memory output signals and control signals from said camera for energizing the display unit, and
   E. a timing circuit responsive to the master timing pulses from the memory unit for deriving therefrom timing signals for said camera, said converter and said synthesizer.

2. A system as recited in claim 1 wherein said camera generates horizontal drive, blanking and synchronizing signals in response to the timing pulses from said timing circuit, said system additionally comprising means for coupling the horizontal drive, blanking and synchronizing signals to said synthesizer to thereby synchronize said synthesizer and said camera.

3. A system as recited in claim 1 wherein said converter comprises:
   A. a threshold circuit responsive to signals from said camera for generating one of two signals,
   B. a multi-stage register energized by first gating pulses from said timing circuit for sampling the output of said threshold circuit and for storing a group of signals in sequence, and
   C. a register unit having a stage corresponding to each stage in said shift register and responsive to second gating pulses from said timing unit for energizing said direct access memory unit with a plurality of signal sequences in parallel which represent the electrical image signal from said television camera.

4. A system as recited in claim 1 wherein said synthesizer includes;
   A. means for reading the signal sequences stored in said given locations in said direct access memory unit simultaneously,
   B. a register energized by said reading means in parallel,
   C. means for causing the contents of said register unit to be shifted therefrom in series, and
   D. a synthesizer responsive to the serial output from said register and to the control signals from said camera for producing a signal comprising control signals and electrical image signals.

5. An image recording and display system as recited in claim 1 including
   a plurality of display units, said memory unit having a plurality of locations for storing parallel signal sets, one location being reserved for each display unit, said system additionally comprising commutator means for routing a set of parallel signals from said converter to the appropriate location in said memory unit.

6. A system as recited in claim 1
   wherein said converter comprises an amplifier with positive feedback for operating at either a first or second saturated condition, and means responsive to electrical image signals from said camera for converting first of said signals to a value which causes a first level of saturation and second of said signals to a level which causes second level of saturation.

7. A system for transmitting an image to one of several remote display units responsive to video signals comprising:

A. a recirculating memory unit including reading and writing means, said memory unit having first, second and third timing signals recorded thereon, B. a frequency converter responsive to said third timing signals from said memory unit for generating a plurality of control timing signals, C. a camera for converting the image into a video signal, said camera generating video control signals in response to first control timing signals from said frequency converter, D. an input circuit including:

1. a video converter responsive to the video signal from said camera for generating a two-level output,
2. a multi-stage shift register unit for sampling the output from said converter and shifting the sampled information in response to second control timing signals, and
3. a multi-stage register unit for receiving the contents of said shift register unit in parallel in response to third control timing signals, said memory unit writing means being connected to receive and record the output of said register unit in parallel, and E. an output circuit for each display unit including:

1. a conditioning unit for converting parallel signals generated by said reading means into an output comprising parallel pulse trains,
2. a second shift register for receiving the outputs from said conditioning unit in parallel in response to fourth control timing signals and serially shifting output pulses therefrom in response to fifth control timing signals, and
3. a synthesizer for generating an output video signal in response to the serial output pulses from said second shift register and the video control signals from said camera for transfer to the display unit in response to signals therefrom.

8. A system as recited in claim 7 additionally comprising a commutator circuit between said input circuit register unit and said storage unit for routing the output from said register unit to a particular area in said memory unit assigned to a specific display unit.

9. A system a recited in claim 7 wherein said memory unit comprises:

A. a magnetic disk for storing the timing signals and parallel output signals from said input circuit, B. means for rotating said magnetic disk past said reading and writing means, C. a master oscillator for generating first and second reference signals, and D. servo means responsive to said first and second timing signals on said disk and the first and second reference signals for controlling said rotating means.

10. A system as recited in claim 7 wherein each output circuit conditioning unit comprises:

A. means responsive to parallel signals from said reading means greater than a first threshold value or less than a second threshold value for generating a first voltage level signal, said threshold means generating a second voltage level for other signal values from said reading means.

11. A system as recited in claim 7 wherein each output circuit shift register unit includes a number of stages exceeding the number of stages in said input circuit multi-stage shift register unit by one.

12. A system as recited in claim 7 wherein said synthesizer circuit includes means responsive to blanking, horizontal drive and synchronization signals from said camera and the output from said second shift register for generating the video signal for a display unit.

13. A system as recited in claim 7 wherein said input circuit converter comprises means for setting first and second threshold levels, said converter generating a first signal in response to video signals greater than the first threshold level and a second signal in response to video signals less than the second threshold level.

14. A system as recited in claim 13 wherein said converter comprises:

A. an operational amplifier including positive feedback means and inverting and non-inverting inputs, said video signal being coupled to said inverting input, B. means for summing the first threshold and video signals at the inverting input, and C. means for summing the second threshold and feedback signals at the non-inverting input.

15. A system as recited in claim 7 wherein the video signal frequency exceeds the maximum recording frequency of said memory unit by less than $n$ times, said input circuit shift register unit and said input stage register unit each including $n$ stages and the frequency of said second control timing signal being $n$ times that of the third timing control signal.

16. A system as recited in claim 15 wherein said output circuit shift register unit includes $(n+1)$ stages, the second through $n$th stages being directly connected to said output conditioning unit, said first stage being connected to only said second stage to receive signals shifted therefrom in response to the fifth control timing signals from said frequency converter.

* * * * *